(No Model.) 2 Sheets—Sheet 1.
T. G. HARDING.
IMPLEMENT FOR BANDING BOXES.
No. 493,330. Patented Mar. 14, 1893.
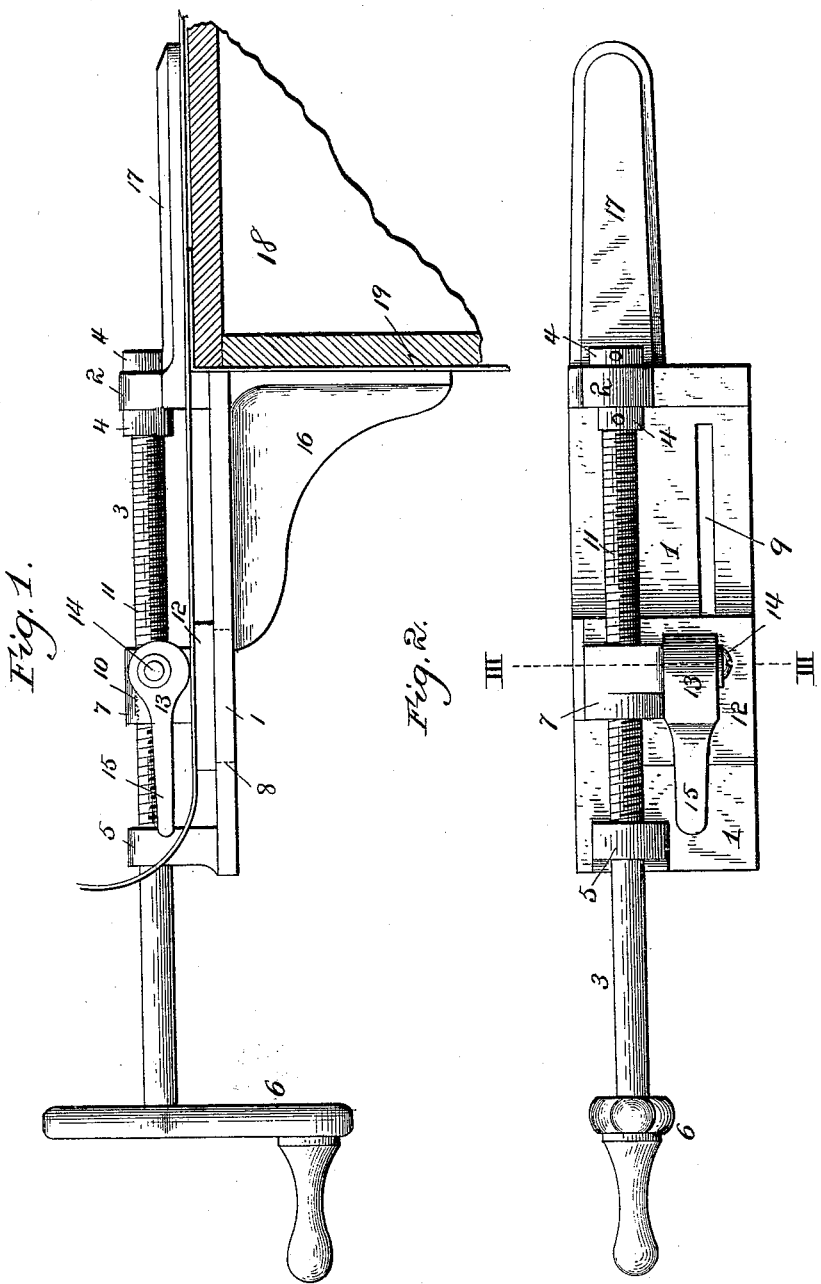
Witnesses:
J.B.McGirr.
J.S. Barker
Inventor:
Thomas G. Harding
by H. N. Low
attorney.

(No Model.) 2 Sheets—Sheet 2.
T. G. HARDING.
IMPLEMENT FOR BANDING BOXES.
No. 493,330. Patented Mar. 14, 1893.
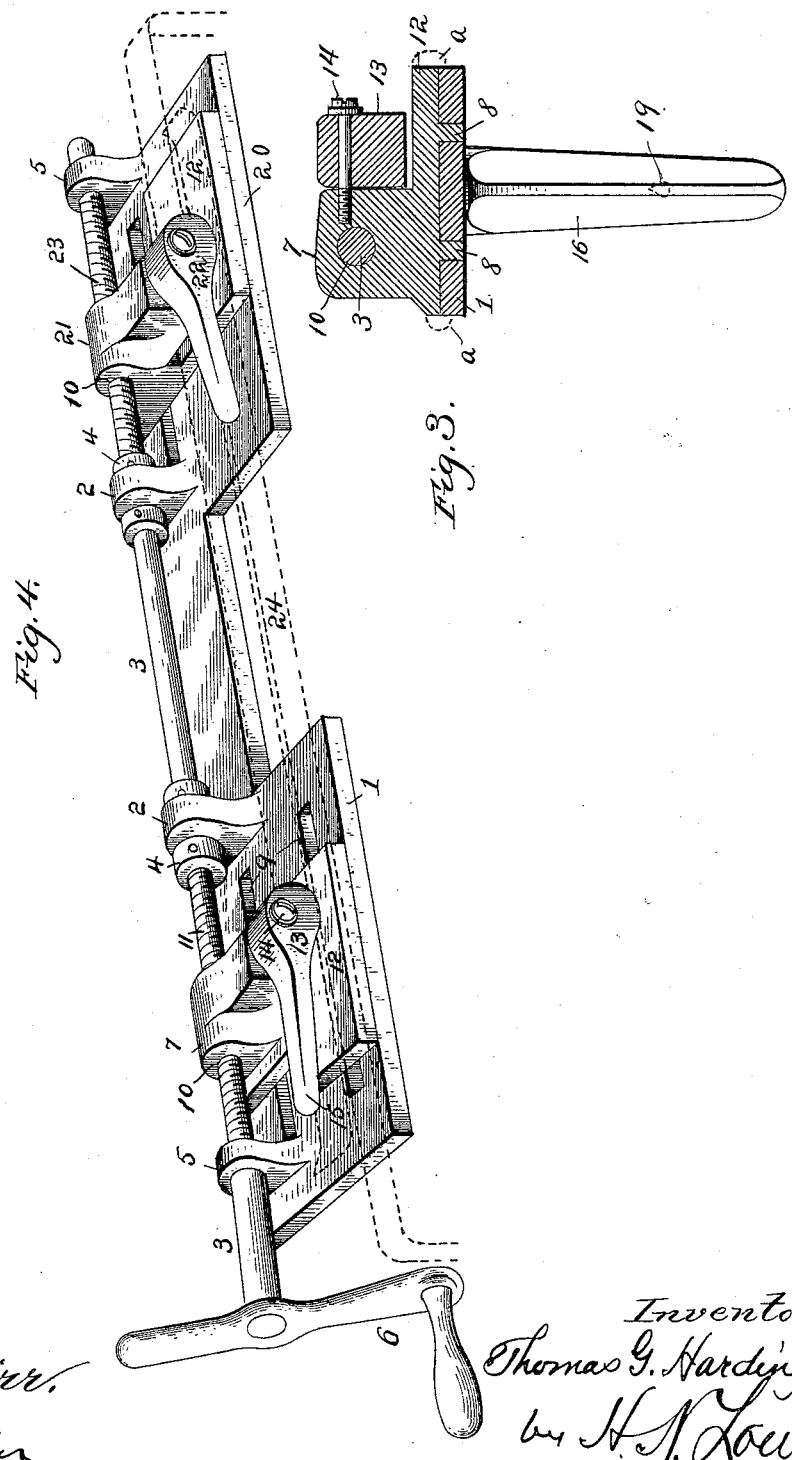
Witnesses:
J. B. McGirr.
J. S. Barker.
Inventor:
Thomas G. Harding,
by H. N. Low
Attorney

UNITED STATES PATENT OFFICE.

THOMAS G. HARDING, OF BURLINGTON, VERMONT, ASSIGNOR OF ONE-HALF TO JEROME W. GOODELL, OF SAME PLACE.

IMPLEMENT FOR BANDING BOXES.

SPECIFICATION forming part of Letters Patent No. 493,330, dated March 14, 1893.

Application filed April 21, 1892. Serial No. 430,052. (No model.)

*To all whom it may concern:*

Be it known that I, THOMAS G. HARDING, a citizen of the United States, residing at Burlington, in the county of Chittenden, State of Vermont, have invented certain new and useful Improvements in Implements for Banding Boxes; and I do declare the following to be a full, clear, and exact description of the invention, such as will enable others skilled in the art to which it appertains to make and use the same.

It is the object of my invention to provide an implement for banding boxes, bales, &c. which will be small and portable, but rapid and efficient in use and of great power. It is necessary in most cases to band boxes after they have been filled with goods, and a machine to which heavy cases must be carried is a very slow and inconvenient means for effecting the purpose.

The implement embodying my invention can be carried readily from case to case and the latter perfectly and quickly banded wherever they may happen to be.

With such object in view my invention consists in the parts and combinations thereof hereinafter set forth and claimed.

In order to make the improvement more clearly understood I have shown in the accompanying drawings means for carrying it into practical effect, without however intending to limit it, in its practical applications, to the particular constructions which, for the sake of illustration, I have delineated.

In said drawings—Figures 1 and 2 are respectively a side and plan view of a box banding implement embodying my invention. Fig. 3 is a sectional view on line III—III, Fig. 2. Fig. 4 is a perspective view of another form of device also embodying my invention.

Referring to the drawings, 1 indicates a plate, which is provided with a bearing bracket 2, in which is mounted so as to freely turn a screw shaft 3. Collars 4 pinned to the shaft on each side of said bracket hold the shaft from longitudinal movement. The plate 1 is also preferably provided with a steady bearing 5 for the outer end of the shaft, on which end is secured a crank-handle or hand wheel 6.

7 indicates a nut fitting and adapted to travel longitudinally on the plate 1 on which it is guided by ribs 8 which enter and fit closely in longitudinal slots or grooves 9 formed in or on the plate; or said nut may be guided by flanges *a* formed at its edge and fitting the edge of the plate 1 (see dotted lines in Fig. 3). The nut is provided with a screw threaded bearing 10 engaged by the screw thread 11 of the shaft 3, and with a lateral shoulder 12.

13 is a cam or eccentric clamp pivoted at 14 on the side of the nut, having an operating handle 15 and adapted to bear against the shoulder 12 and co-operate with it in holding the flat hoop iron band or other material with which the box is to be banded.

I may employ means for bracing the implement against the box during the banding operation, or both ends of the band may be attached to the implement. The first means is shown in Figs. 1, 2, consisting of a bracket or arm 16 attached to the plate 1 and extending from the same on the side of the plate opposite to the clamp 13, and of a second arm 17 extending in a direction in line or parallel with the shaft. The arm 16 is adapted to rest against one side and the arm 17 against another of a box, a portion of which latter is shown at 18 in Fig. 1, said arms being at right angles to each other, or otherwise shaped to fit the box or package to be operated upon. The second means is illustrated also in said figures (1 and 2), consisting of a spur 19 mounted on some suitable part of the implement, such as on the arm 16, and adapted to be passed into a perforation made for it in one end of the band, as indicated in Fig. 1.

In Fig. 4 is illustrated a means for not only attaching both ends of the band to the implement but for drawing both ends together so that they may be united by a suitable clasp or tie. In this form of device any means for engaging the box is dispensed with, and the plate 1 has an extension constituting a second plate 20 provided with a nut 21 and clamp 22. The shaft 3 is correspondingly extended and furnished with a left hand thread 23.

In using the form of implement shown in Figs. 1, 2, and 3 one end of the band is nailed to the box, or is perforated and passed over the spur 19. The band is then passed around the box and the other end placed on the shoulder 12, to which it is clamped by the cam or eccentric 13. The crank 6 is now turned in such direction as to draw the nut, by the action of the screw, away from the box and tighten the band to the required degree, firmly drawing and holding together the parts of the box or other package. The band is then nailed in place and the clamp loosened and the implement removed.

If it is desired to join the ends of the band by a clasp or other buckle or tie the form of the invention shown in Fig. 4 may be employed. In such case one end of the band is secured in the clamp 22 passed over the plate 1, as indicated in dotted lines in said figure, around the package, and its other end secured in the clamp 13. By now turning the crank in the proper direction the nuts are moved away from each other and the band tightly stretched. Between the two clamps a space 24 is left, at which point the ends of the band pass each other and are readily accessible, being above the surface of the package, for the attachment of a clasp by which they will be united.

The invention might be availed of by screw-threading the bearing 5 and giving the part 7 a smooth bearing, the collars 4 being removed from each side of the bearing 5 and secured to the shaft at each side of the part 7.

What I claim is—

In a box banding machine, the combination with the screw 3, and traveling nut thereon having the clamp 13, of the plate 1 provided with guides for said nut and bearings for the screw and having the arm 17 parallel with the screw and the arm 16 at right angles to the screw and intermediate between said clamp and arm 17 for holding the plate with its clamp out beyond the side of the box to be banded, substantially as set forth.

In testimony whereof I affix my signature in the presence of two witnesses.

THOMAS G. HARDING.

Witnesses:
 JEROME W. GOODELL,
 JENNIE STACY.